(12) United States Patent
Cubalchini, Jr.

(10) Patent No.: US 7,654,370 B2
(45) Date of Patent: Feb. 2, 2010

(54) SHOCK ABSORBER WITH INTEGRATED POSITION SENSOR

(75) Inventor: Joseph Cubalchini, Jr., St. Charles, IL (US)

(73) Assignee: Arvin Technologies, Inc., Troy, MI (US)

( * ) Notice: Subject to any disclaimer, the term of this patent is extended or adjusted under 35 U.S.C. 154(b) by 254 days.

(21) Appl. No.: 11/701,805

(22) Filed: Feb. 2, 2007

(65) Prior Publication Data

US 2008/0189010 A1 Aug. 7, 2008

(51) Int. Cl.
*F16F 15/03* (2006.01)
(52) U.S. Cl. .................................. 188/267; 188/313
(58) Field of Classification Search .................. 188/313, 188/314, 267, 1.11 R, 1.11 E, 282.2; 280/5.512, 280/5.515
See application file for complete search history.

(56) References Cited

U.S. PATENT DOCUMENTS

| | | | |
|---|---|---|---|
| 3,687,483 A | 8/1972 | Gull | |
| 4,771,866 A | 9/1988 | Heideman | |
| 4,802,657 A | 2/1989 | Wijnhoven | |
| 4,989,844 A | 2/1991 | Wijnhoven | |
| 5,135,203 A | 8/1992 | Wijnhoven | |
| 5,152,547 A * | 10/1992 | Davis | 188/313 |
| 5,233,293 A | 8/1993 | Huang | |
| 5,251,729 A | 10/1993 | Nehl et al. | |
| 5,451,870 A * | 9/1995 | Gesenhues et al. | 324/207.15 |
| 2002/0100649 A1 | 8/2002 | Agrotis et al. | |
| 2006/0011426 A1 | 1/2006 | Sas et al. | |

FOREIGN PATENT DOCUMENTS

| | | | |
|---|---|---|---|
| DE | 3446411 | | 7/1986 |
| DE | 19818796 | | 11/1999 |
| DE | 102006057362 A1 * | | 6/2008 |
| FR | 2608752 | | 6/1988 |
| GB | 2108678 | | 5/1983 |
| JP | 60008104 | | 1/1985 |
| JP | 61136696 | | 6/1986 |
| JP | 5272906 | | 10/1993 |
| JP | 06094404 A * | | 4/1994 |

OTHER PUBLICATIONS

European Search Report dated Sep. 18, 2009.

* cited by examiner

*Primary Examiner*—Melanie Torres
(74) *Attorney, Agent, or Firm*—Carlson, Gaskey & Olds

(57) ABSTRACT

A shock absorber includes a dust tube that surrounds a shock body. The shock body is movable relative to the dust tube in response to road load inputs. A plurality of magnets is mounted to one of the dust tube and shock body, and a module is mounted to the other of the dust tube and shock body. The module interacts with the plurality of magnets to determine a position of the dust tube relative to a position of the shock body. This position information can be used to adjust suspension ride height as needed.

24 Claims, 3 Drawing Sheets

SHOCK ABSORBER WITH INTEGRATED POSITION SENSOR

TECHNICAL FIELD

A shock absorber includes an integrated position sensor that is used to adjust suspension ride height.

BACKGROUND OF THE INVENTION

Air suspensions include leveling valves that can be adjusted to change a ride height of the air suspension. With current air suspensions, ride height is set by, and adjusted by, a mechanical linkage that is attached to the leveling valves. This mechanical linkage must be manually actuated by an operator to adjust ride height. One disadvantage with this system is that the mechanical linkage adds complexity, is labor intensive and increases weight. Additionally, operators do not always set the ride height at a proper level based on vehicle application and/or payload.

Other types of suspensions systems, such as adaptive, semi-active, and active suspensions use accelerometers and/or displacement transducers to determine wheel position and wheel velocity. This information is then used to adjust right height as needed. One disadvantage with this configuration is that the additional components, i.e. accelerometers and displacement transducers, increase the cost of the suspension system.

Thus, there is a need for a simplified method and apparatus for adjusting ride height that eliminates the need for accelerometers and transducers, eliminates potential operator error, and which overcomes the other above-mentioned difficulties in the prior art.

SUMMARY OF THE INVENTION

A shock absorber includes an integrated position sensor that can be used to adjust suspension ride height. In one example, a rod is movable relative to a shock body along a rod axis, and a dust tube has an inner surface that surrounds an outer surface of the shock body. A plurality of magnets is mounted to one of the dust tube and shock body, and a module is mounted to the other of the dust tube and shock body. The module determines a position of the dust tube relative to a position of the shock body based on interaction between the plurality of magnets and the module. Position information is communicated to a suspension control, and suspension ride height is adjusted as needed based on the position information.

In one example, the module comprises a control module that includes a position sensing circuit that determines the position information, and a communication circuit that communicates the position information to the suspension control. The communication circuit includes a transceiver for wirelessly communicating position information to a location remote from the shock body, for example.

The control module includes a coil that interacts with the plurality of magnets to generate power for the position sensing circuit and the communication circuit. In one example, the control module also includes a power storage device, such as a capacitor, that stores power generated by relative movement between the coil and the plurality of magnets.

In one disclosed embodiment, adjacent magnets are axially spaced apart from each other in a direction along the rod axis. As the coil passes over each magnet a pulse is generated. The position sensing circuit counts the pulses and determines the position information based on the pulses counted. The communication circuit communicates the position information to a suspension control, which in turn communicates with a leveling valve to adjust suspension ride height as needed.

The subject invention provides a simplified method and apparatus for easily adjusting suspension ride height. These and other features of the present invention can be best understood from the following specification and drawings, the following of which is a brief description.

DETAILED DESCRIPTION OF THE PREFERRED EMBODIMENT

Figure 1:
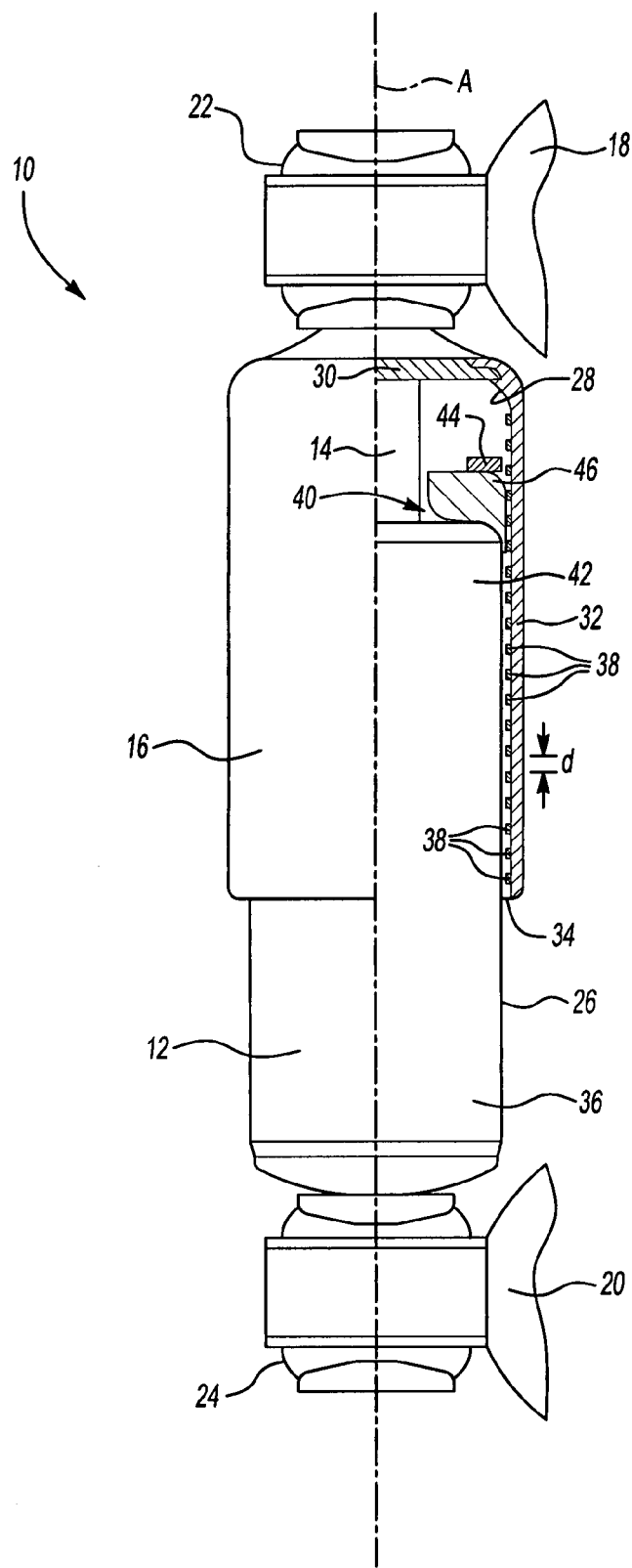
FIG. 1 is a side view of a shock absorber, shown in partial cross-section, incorporating an example of the subject invention.

As shown in FIG. 1, a shock absorber 10 includes an outer shock body 12, a rod 14 that is movable relative to the shock body 12 along a rod axis A, and a dust tube 16 that protects the shock body 12. One of the rod 14 and the shock body 12 is attachable to a vehicle frame or chassis 18 and the other of the rod 14 and shock body 12 is attachable to a wheel or axle component 20. In the example shown, the rod 14 is attached to the vehicle chassis 18 via a first mounting bushing 22 and the shock body 12 is attached to an axle component 20 via a second mounting bushing 24. Thus, the shock body 12 moves with the axle component 20 and the dust tube 16 and rod 14 moves with the vehicle chassis 18. A reverse mounting configuration could also be used.

As known, the rod 14 extends into an interior of the shock body 12 and is coupled to a piston assembly (not shown). Operation of the shock absorber 10 to dampen road load inputs is known and will not be discussed in further detail.

The shock body 12 includes an outer surface 26 that faces an inner surface 28 of the dust tube 16. The shock body 12 is movable relative to the dust tube 16 in response to road load inputs. In the example shown, the dust tube 16 is fixed to the rod 14, which is in turn mounted to the vehicle chassis 18. The dust tube 16 includes a cup-shaped or base portion 30 at one end that is attached to the rod 14. A tubular portion 32 extends from the base portion 30 down a length of the shock body 12. The tubular portion 32 has an open end 34 opposite from the base portion 30 such that an end 36 of the shock body 12 extends outwardly from the dust tube 16. The inner surface 28 of the dust tube 16 extends from the base portion 30 to the open end 34.

A plurality of magnets 38 is mounted to the dust tube 16. The magnets can be positioned in a wall of the dust tube 16 or can be supported by the inner surface 28 of the dust tube 16. In the example shown, the magnets 38 are mounted to the inner surface 28 of the dust tube 16. The magnets 38 are axially spaced apart from each other in a direction along the rod axis A. In the example shown, the magnets extend generally along an entirety of the length of the inner surface 28, i.e. magnets 38 extend from the base portion 30 to the open end 34; however the magnets could extend only along a portion of the length. Positioning multiple magnets along the length of the dust tube 16 provides very accurate positional information. Each magnet 38 is spaced apart from an adjacent magnet 38 by a predetermined distance d. The predetermined distance d can be generally constant between adjacent magnets 38 or can vary. Thus, the inner surface 28 of the dust tube 16 has a plurality of magnetic zones with varying magnetic flux density that are separated from each other by non-magnetic zones. The dust tube 16 can be made from plastic material, for example, to form the non-magnetic zones; however other materials could also be used.

A control module 40 is mounted to the outer surface 26 of the shock body 12 at a position near where the rod 14 extends out of the shock body 12. The control module 40 is mounted to an end 42 of the shock body 12 that is opposite from the end 36 that extends outwardly of the dust tube 16. The control module 40 is an electronic module that includes a coil 44, such as a wound wire coil for example, and a module body 46. Relative movement between the coil 44 and the plurality of magnets 38 generates power for the control module 40. Further, interaction between the coil 44 and magnets 38 can be used to determine a position of the shock absorber 10. This will be discussed in greater detail below.

Figure 3:
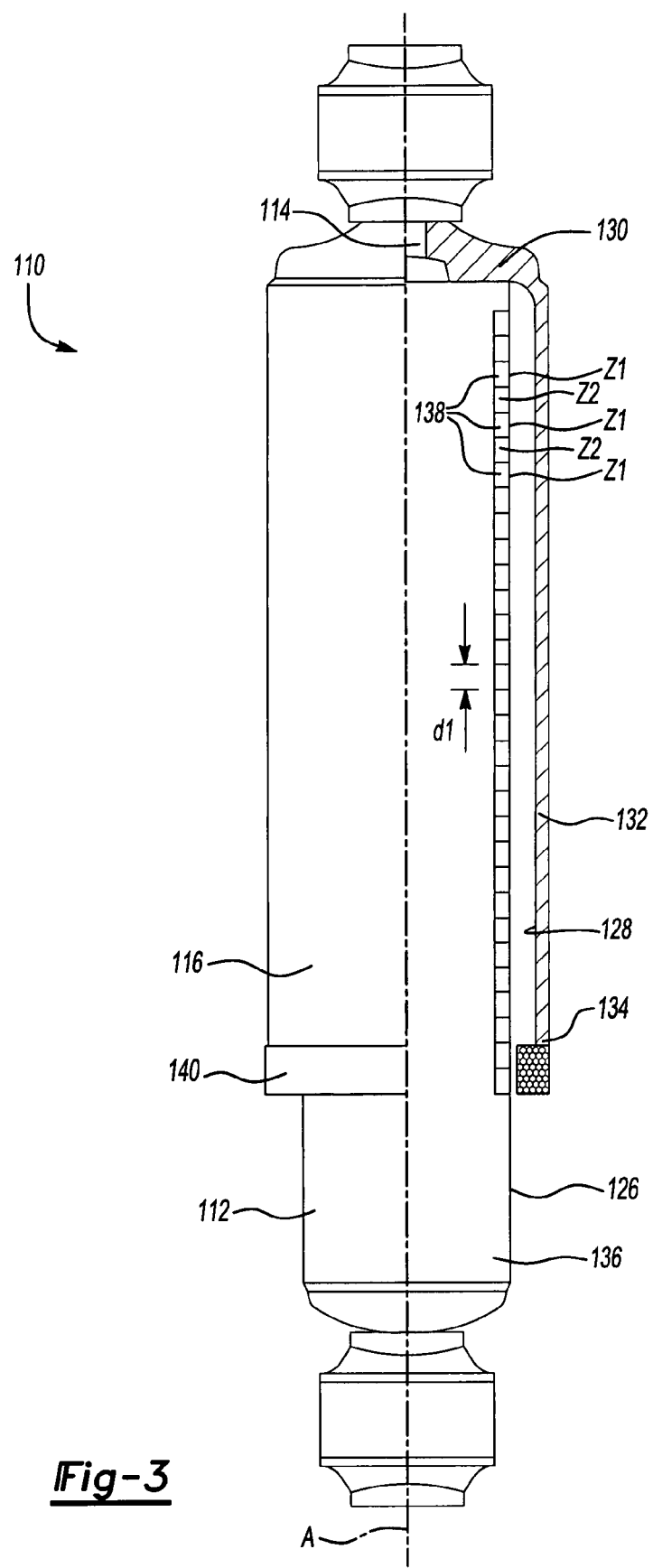
FIG. 3 is a side view of another shock absorber, shown in partial cross-section, incorporating another example of the subject invention.

Another example of a shock absorber 110 is shown in FIG. 3. In this example, the shock absorber 110 includes an outer shock body 112, a rod 114 that is movable relative to the shock body 112 along the rod axis A, and a dust tube 116 that protects the shock body 112. As described above with regard to the example shown in FIG. 1, one of the rod 114 and the shock body 112 is attachable to the vehicle frame or chassis 18 and the other of the rod 114 and shock body 112 is attachable to a wheel or axle component 20. In the example shown, the shock body 112 moves with the axle component 20 and the dust tube 116 and rod 114 moves with the vehicle chassis 18. A reverse mounting configuration could also be used.

The shock body 112 includes an outer surface 126 that faces an inner surface 128 of the dust tube 116. The shock body 112 is movable relative to the dust tube 116 in response to road load inputs. The dust tube 116 includes a cup-shaped or base portion 130 at one end that is attached to the rod 114. A tubular portion 132 extends from the base portion 130 down a length of the shock body 112. The tubular portion 132 has an open end 134 opposite from the base portion 130 such that an end 136 of the shock body 112 extends outwardly from the dust tube 116.

A plurality of magnets 138 is mounted to the outer surface 126 of the shock body 112. The magnets 138 can be positioned in a wall of the shock body 112 or each magnet 138 can be separately supported by the outer surface 126 of the shock body. In the example shown, all of the magnets 138 are supported on a common polarized strip 180 that is attached as single unit to the outer surface 126 of the shock body 112. The strip 180 is made from a non-metallic material and includes polarized magnetic zones Z1 that are separated from each other by non-magnetic zones Z2.

In each of these examples, the magnets 138 are axially spaced apart from each other in a direction along the rod axis A. In the example shown, the magnets 138 extend generally along a significant portion of the length of the shock body 112. This provides very accurate position information. Each magnet 138 is spaced apart from an adjacent magnet 138 by a predetermined distance d. The predetermined distance d can be generally constant between adjacent magnets 138 or can vary. Thus, the shock body 112 includes a plurality of magnetic zones Z1 with varying magnetic flux density that are separated from each other by non-magnetic zones Z2.

In the example of FIG. 3, a module 140 is mounted at the open end 134 of the dust tube 116. The module 140 generates electrical pulses due to interaction with the magnetic zones. The module 140 transmits the electrical pulses to a control module via a wire, for example. The module 140 can be embedded within a wall of the dust tube 116 or mounted to the inner surface 28 of the dust tube 116. In the example shown, the module 140 is mounted to an end of the dust tube 116 such that the module 140 forms a downward extension portion of the dust tube 116.

The control module for use with the example of FIG. 3 can be located adjacent to, or remotely from, the shock absorber 110. The control module receives the electrical pulses and then determines position and/or velocity to control valves that adjust ride height and/or shock damping, such as that shown in FIG. 2 which will be discussed in greater detail below. This determination can be done in an ABS computer, an engine computer, or a vehicle body computer, for example.

Figure 2:
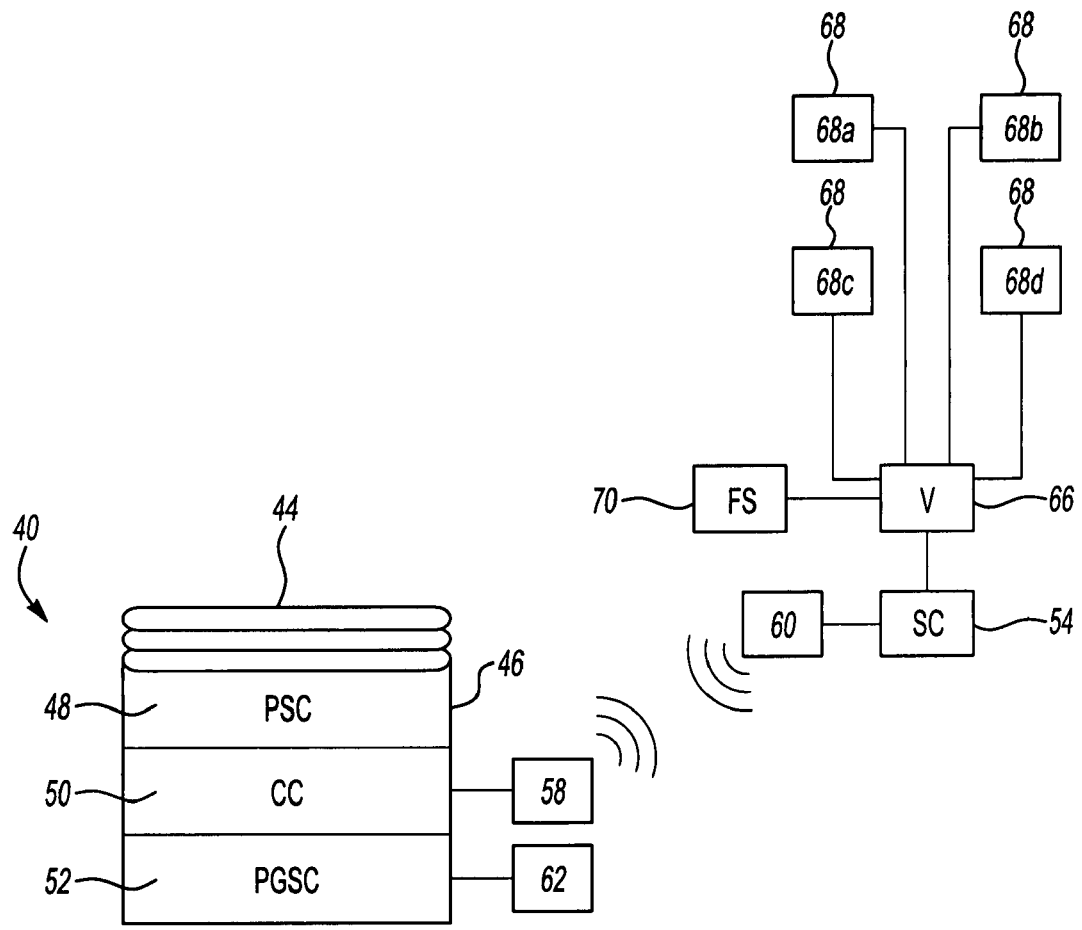
FIG. 2 is a schematic diagram of a shock absorber control module and suspension control module.

The control module 40 for FIG. 1 is shown in greater detail in FIG. 2. In the example shown, the control module 40 includes a position sensing circuit 48, a communications circuit 50, and a power generation and storage circuit 52. The position sensing circuit 48, communications circuit 50, and power generation and storage circuit 52 are associated with the module body 46.

The position sensing circuit 48 determines a position of the dust tube 16, 116 relative to a position of the shock body 12 and/or the shock position in relation to the vehicle frame or chassis 18. The position sensing circuit 48 can be a Magneto-resistor, for example. A pulse is generated as the coil 44 passes over each magnet 38, 138. The position sensing circuit 48 counts the pulses and determines position information based on the pulses counted. The position sensing circuit 48 generates a position signal representative of the determined position information. This position information is used to determine a ride height for a vehicle suspension.

The communications circuit 50 communicates the position signal to a suspension control module 54, and can use Bluetooth technology, for example. In the example shown, the communications circuit 50 includes a transceiver 58 that wirelessly communicates position information to a transceiver or receiving unit 60 associated with the suspension control module 54. The power generation and storage circuit 52 generates and regulates power for the control module 40 via interaction between the coil 44 and the magnets 38, 138. The power generation and storage circuit 52 includes a storage device 62, such as a capacitor for example, that stores generated power for the control module 40.

In this example, the suspension control module 54 is remote from the control module 40, which is associated with the shock absorber 10. The suspension control module 54 is associated with a valve assembly 66 that is used to adjust an adjustable suspension component 68 that is associated with each axle wheel. In the example shown, a tandem axle configuration is shown with adjustable suspension components 68a-d at each of the four wheels; however, other types of axle configurations could also be used.

The valve assembly 66 can comprise a plurality of separate valves, such as one valve associated with each adjustable suspension component 68, or it can be a single valve assembly that communicates with each adjustable suspension component 68. The adjustable suspension component can be the shock absorber 10 itself, or could be another adjustable component such as an air spring for example. The valve assembly 66 is in communication with a supply 70. In one example, the valve assembly 66 comprises a solenoid valve. The suspension control module 54 generates a control signal that is communicated to the valve assembly 66, which supplies air to, or exhausts air from, the adjustable suspension component 68 to increase or decrease ride height as needed based on position information received from the control module 40.

In the example of a tandem axle configuration, a shock absorber 10 is associated with each of the four (4) wheels, i.e. two shock absorbers for the forward-rear axle and two shock absorbers for the rear-rear axle. In a typical air suspension, the shock absorber 10 comprises a suspension stop in extension. This is used as a reference point to set suspension ride height. In response to road load inputs or payload changes, position signals from pairs of cross-corner shock absorbers can be averaged together, i.e. the position signals from a driver front corner shock and a passenger rear corner shock would be averaged together, and the position signals from a passenger front corner shock and a driven rear corner shock would be averaged together. The suspension control module 54 would use this averaged signal to determine if the valve assembly 66 should remain closed, increase ride height, or decrease ride height.

The use of a plurality of magnets provides very accurate and consistent positional information that can easily be used to adjust ride height, etc. By using the shock absorber with the integrated sensor in air suspensions, valve assembly cost is reduced as well as labor and assembly costs. Further, by eliminating the mechanical linkage, operator adjustment error is eliminated.

With adaptive, semi-active, and active suspensions, the shock absorber with integrated position sensor would operate in a traditional manner, but additional accelerometers, displacement sensors, and associated wiring harnesses are no longer required. This integrated sensor could be adapted to work with air springs, air and/or oil struts, and air and/or oil shock absorbers. Further, adaptive and semi-active shock absorbers and/or strut modules can be made to be self-powered (FIG. 1) such that associated power wiring is no longer necessary.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A shock absorber assembly comprising:
    a shock body;
    a rod movable relative to said shock body along a rod axis, one of said shock body and rod being mountable to an axle component and the other of said shock body and said rod being mountable to a vehicle chassis;
    a dust tube having an inner surface surrounding an outer surface of said shock body with the shock body being movable relative to the dust tube in response to road load inputs;
    a plurality of magnets fixed to one of said dust tube and said shock body wherein at least some of said plurality of magnets are axially spaced apart from an adjacent magnet in a direction along said rod axis to from a plurality of magnetic zones that are separated from each other by non-magnetic zones; and
    a module fixed to the other of said dust tube and said shock body, said module interacting with said plurality of magnets to determine a position of said dust tube relative to a position of said shock body.

2. The shock absorber assembly according to claim 1 wherein said dust tube includes a base portion at one end adjacent said rod and is open at an opposite end such that said shock body extends outwardly from said dust tube in a direction along said rod axis, and wherein said inner surface of said dust tube extends from said base portion to said opposite end with said plurality of magnets being positioned substantially along an entire length of said inner surface, with each magnet being spaced apart from an adjacent magnet by a predetermined distance to from one non-magnetic zone.

3. The shock absorber assembly according to claim 1 wherein said module comprises a control module including a coil and a position sensing circuit, wherein said position sensing circuit generates a position signal that is communicated to a suspension control.

4. The shock absorber assembly according to claim 3 wherein said control module includes a communications circuit that communicates said position signal to said suspension control and wherein relative movement between said coil and said plurality of magnets generates power for said position sensing circuit and said communications circuit.

5. The shock absorber assembly according to claim 4 wherein said suspension control determines whether a suspension height is to be adjusted based on said position signal and generates a control signal for communication to a leveling valve assembly to adjust suspension height as desired.

6. The shock absorber assembly according to claim 4 wherein said communications circuit includes a transceiver that wirelessly communicates said position signal to said suspension control.

7. The shock absorber assembly according to claim 3 wherein said control module includes a power storage device for storing power generated by relative movement between said coil and said plurality of magnets.

8. The shock absorber assembly according to claim 3 wherein said position sensing circuit counts pulses generated by relative movement between said coil and said plurality of magnets as said shock body moves relative to said dust tube along said rod axis to determine said position of said dust tube relative to said shock body.

9. The shock absorber assembly according to claim 1 wherein said plurality of magnets are supported on said shock body and are positioned to extend along a substantial length of said shock body.

10. The shock absorber assembly according to claim 9 wherein said plurality of magnets are supported by a common strip that is attached to said outer surface of said shock body.

11. The shock absorber assembly according to claim 1 wherein said module comprises a module body including a coil that interacts with said plurality of magnets, a position sensing circuit that determines a relative position of said dust tube or shock body and generates a corresponding position signal, a communications circuit that communicates said position signal to a suspension control module, and a power generation and storage circuit the generates and stores power for said module via interaction between said plurality of magnets and said module.

12. The shock absorber assembly according to claim 1 wherein said dust tube has an open end to atmosphere and wherein said shock body comprises an outermost cylinder of a shock absorber, and wherein one of said plurality of magnets and said module is directly fixed to said dust tube at said open end.

13. A method for controlling suspension ride height comprising the steps of:
    (a) providing a shock body, a rod movable relative to the shock body along a rod axis, and a dust tube having an inner surface surrounding an outer surface of the shock body;
    (b) mounting a plurality of magnets to one of the dust tube and shock body by spacing at least some of the plurality of magnets axially apart from an adjacent magnet in a direction along the rod axis to form a plurality of magnetic zones that are separated from each other by non-magnetic zones, (c) mounting a module to the other of the dust tube and shock body;

(d) determining a position of the dust tube relative to a position of the shock body based on interaction between the plurality of magnets and the module;

(e) communicating position information from step (d) to a suspension control; and (f) adjusting suspension ride height based on the position information of step (e).

14. The method according to claim 13 wherein the module generates pulses and wherein step (d) includes counting pulses generated during relative movement between the module and the plurality of magnets to determine position information.

15. The method according to claim 13 wherein the module comprises a control module that includes a coil, and including generating power for the control module from relative movement between the coil and the plurality of magnets.

16. The method according to claim 15 including storing generated power in a power storage device associated with the control module.

17. The method according to claim 13 wherein step (e) includes wirelessly communicating position information to a location remote from the shock body.

18. The method according to claim 13 wherein step (f) includes communicating a leveling control signal to a leveling valve assembly in fluid communication with a fluid supply and adjusting suspension ride height by one of increasing and decreasing fluid supply to an adjustable suspension component.

19. The method according to claim 13 wherein the dust tube has an open end to atmosphere and wherein the shock body comprises an outermost cylinder of a shock absorber, and including directly fixing one of the plurality of magnets and the module to the dust tube at the open end.

20. The method according to claim 13 including assembling a coil, a position sensing circuit, a communications circuit, and a power generation and storage circuit together to form the module that is mounted to the other of the dust tube and shock body as a single module unit in step (c).

21. A suspension assembly comprising:

a first suspension element comprising a shock absorbing body;

a second suspension element movable relative to said shock absorbing body along an axis, one of said first and second suspension elements being mountable to an axle component and the other of said first and second suspension elements being mountable to a vehicle chassis;

a dust tube having an inner surface surrounding an outer surface of said shock absorbing body with the shock absorbing body being movable relative to the dust tube in response to road load inputs;

a plurality of magnets fixed to one of said dust tube and said shock absorbing body;

a module fixed to the other of said dust tube and said shock absorbing body and facing said plurality of magnets, said module comprising a module body that includes a coil, a position sensing circuit that determines a relative position of said dust tube or shock body based on interaction between said plurality of magnets and said coil, a communications circuit, and a power generation and storage circuit that generates and stores power for said module via interaction between said plurality of magnets and said module, and wherein said position sensing circuit generates a corresponding position signal representing a position of said dust tube relative to a position of said shock absorbing body; and a suspension control module for adjusting ride height in response to a control signal generated based on the position of said dust tube relative to said shock absorbing body wherein said module communicates with said suspension control module via said communications circuit.

22. The suspension assembly according to claim 21 including a valve assembly in fluid communication with an air supply wherein said suspension control module generates a valve control signal to activate said valve assembly to supply air to an adjustable suspension component or exhaust air from the adjustable suspension component to set ride height to a desired level, said adjustable suspension component comprising at least one of a shock absorber or air spring.

23. The suspension assembly according to claim 21 wherein said dust tube has an open end to atmosphere and wherein said shock absorbing body comprises an outermost cylinder of a shock absorber, and wherein one of said plurality of magnets and said module is directly fixed to said dust tube at said open end.

24. The suspension assembly according to claim 21 wherein at least some of said plurality of magnets are axially spaced apart form an adjacent magnet in a direction along said rod axis to form a plurality of magnetic zones that are separated from each other by non-magnetic zones.

* * * * *